US012359962B2

(12) United States Patent
Greenberg

(10) Patent No.: US 12,359,962 B2
(45) Date of Patent: *Jul. 15, 2025

(54) OBJECT MEASUREMENT DEVICE

(71) Applicant: Software Developers LLC, Lakewood, NJ (US)

(72) Inventor: Jeremy Greenberg, Lakewood, NJ (US)

(73) Assignee: Seller Hardware LLC, Cranbury, NJ (US)

( * ) Notice: Subject to any disclaimer, the term of this patent is extended or adjusted under 35 U.S.C. 154(b) by 356 days.

This patent is subject to a terminal disclaimer.

(21) Appl. No.: 18/050,169

(22) Filed: Oct. 27, 2022

(65) Prior Publication Data

US 2023/0075046 A1 Mar. 9, 2023

Related U.S. Application Data

(63) Continuation-in-part of application No. 17/329,786, filed on May 25, 2021, now Pat. No. 11,892,338.

(Continued)

(51) Int. Cl.
*G01G 21/22* (2006.01)
*G01G 21/23* (2006.01)
(Continued)

(52) U.S. Cl.
CPC .............. *G01G 21/22* (2013.01); *G01G 21/23* (2013.01); *G01G 21/28* (2013.01); *G01G 23/362* (2013.01); *G01G 23/3728* (2013.01)

(58) Field of Classification Search
CPC ........ G01G 21/22; G01G 21/23; G01G 21/28; G01G 23/362; G01G 23/3728
(Continued)

(56) References Cited

U.S. PATENT DOCUMENTS 5,331,118 A * 7/1994 Jensen .................... G01B 11/00
702/170
5,793,652 A * 8/1998 DeBarber ........ G07B 17/00362
705/401

(Continued)

OTHER PUBLICATIONS

U.S. Appl. No. 17/329,786, filed May 25, 2021.
(Continued)

*Primary Examiner* — Jacques M Saint Surin
(74) *Attorney, Agent, or Firm* — Mark Malek; Jonathan Staudt; Widerman Malek, PL

(57) ABSTRACT

An object measurement device for ascertaining measurements of cuboidal and boxed packages to provide measurement data to a host computer is provided. The device may include a frame, a weight sensor, and one or more dimension sensors. The frame may include a base and a vertical support member that extends vertically from the base. The weight sensor may be positioned on the base and may be configured to emit a weight data signal. The dimension sensors may include an upper sensor and one or more side sensors. The upper sensor may be positioned on the vertical support member, and the side sensors may be positioned adjacent to the base. The dimension sensors may be configured to emit dimensional data signals. The host computer may be in communication with the weight and dimension sensors. The host computer may be configured to receive the weight and the dimensional measurement data.

24 Claims, 11 Drawing Sheets

Related U.S. Application Data

(60) Provisional application No. 63/040,331, filed on Jun. 17, 2020.

(51) Int. Cl.
  *G01G 21/28* (2006.01)
  *G01G 23/36* (2006.01)
  *G01G 23/37* (2006.01)

(58) Field of Classification Search
  USPC .................................................... 177/251.3
  See application file for complete search history.

(56) References Cited

U.S. PATENT DOCUMENTS

| | | | |
|---|---|---|---|
| 5,991,041 A * | 11/1999 | Woodworth | G01B 11/04 356/613 |
| 6,373,579 B1 * | 4/2002 | Ober | G01B 11/002 356/309 |
| 9,739,546 B2 * | 8/2017 | Bertilsson | G01M 3/40 |
| 9,779,546 B2 | 10/2017 | Hunt | |
| 10,148,918 B1 | 12/2018 | Seiger | |
| 10,311,634 B2 | 6/2019 | Houghton | |
| 10,466,356 B2 | 11/2019 | Rastogi | |
| 10,776,661 B2 * | 9/2020 | Gu | G06T 7/77 |
| 11,216,774 B2 | 1/2022 | Powers | |
| 11,892,338 B2 * | 2/2024 | Greenberg | G01B 17/00 |
| 2023/0075046 A1 | 3/2023 | Greenberg | |
| 2024/0210233 A1 * | 6/2024 | Greenberg | G01G 23/3707 |

OTHER PUBLICATIONS

U.S. Appl. No. 63/040,331, filed Jun. 17, 2020.
CubiScan 100, Full Specification of Applications/Benefits, accessed on Jul. 12, 2021 at https://www.barcodesinc.com/cubiscan/100.htm.
Walz, Walz SPS-MT—Static Package Scanner Dimensioning & Weighing System, accessed on Jul. 12, 2021 at https://walzeq.com/products/mailing/shipping-solutions/dimensional-weighing/sps-mt/#gsc.tab=0.

* cited by examiner

OBJECT MEASUREMENT DEVICE

RELATED APPLICATIONS

This application is a continuation-in-part application of and claims priority under 35 U.S.C. § 120 of U.S. patent application Ser. No. 17/329,786 filed on May 25, 2021 and titled FOUR-DIMENSION (4D) SCALE FOR DISTRIBUTION AND WAREHOUSE MANAGEMENT, AND ASSOCIATED METHODS, which, in turn, claims priority under 35 U.S.C. § 119(e) of U.S. Provisional Patent Application Ser. No. 63/040,331 filed on Jun. 17, 2020 and titled FOUR-DIMENSION (4D) SCALE FOR DISTRIBUTION AND WAREHOUSE MANAGEMENT, AND ASSOCIATED METHODS. The contents of these applications are incorporated herein by reference, except to the extent that the content therein conflicts with the content herein.

FIELD OF THE INVENTION

The present invention relates to systems and methods for an object weighing and dimensioning device for objects. Specifically, for ascertaining measurements of cuboidal and boxed packages, and providing data to computational devices for improving package management processes.

BACKGROUND OF THE INVENTION

Distribution and warehousing operations include logistics, shipping and postmarking systems, and may include the use of a parcel sizing device for the automatic determination of the three dimensions of a parcel, which dimensions are used to determine the shipping charge or the postage amount for the parcel.

Determining the amount of parcel postage for a shipment depends on several parameters including the size and weight of the parcel. The weight may either be entered manually with an external scale or be sent automatically when the scale is connected to the automated system. The dimensions of the parcel can be determined manually or automatically by a sender with a sizing device.

Small scale merchants, such as merchants that have less than 25 employees, need an efficient and easy way to weigh and determine the dimensions of items, objects, and packages for shipping purposes. Often small scale merchants manually weigh packages and manually determine the size/dimensions of packages and then manually enter that information into a computer terminal to organize shipping and estimate shipping costs. Thus, there is a need and desire by small scale merchants for a way to more efficiently obtain information regarding the weight and dimensions of packages, and to digitize and save that information in a convenient and cost-effective manner.

U.S. Pat. No. 5,841,541 describes a method and apparatus for measuring the three dimensions of a parcel. The parcel is placed in the corner of a field of measurement upon a flat surface and against two adjacent walls. At the base of each wall, and along the angle where the adjacent walls meet, is a calibrated reflective strip. The calibration marks on each of the reflective strips are of known size and spacing. Two mobile sensors are activated for reading the number of visible calibrated marks and transmitting this data to a processor which calculates the length, width, and height of the parcel by subtracting the observed visible calibration marks from the number of possible calibration marks. The three dimensions (length, width, height) and eventually the weight can then be displayed and/or transmitted to a parcel processing system.

U.S. Pat. No. 5,422,861 is directed to a method and apparatus for measuring the dimensions and determining the three-dimensional, spatial volume of objects. An object detection system is used to detect proper placement of an object to be measured, and waveguides are employed as standoffs and received wave isolators for reflected-wave sensors.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to an object measurement device to ascertain measurements of an object and to provide data to a host computer. The device may include a base, a vertical support member, a weight sensor, and a number of dimension sensors. The base may be configured to carry objects on it. The vertical support member may be extending from the base in an upwards direction.

The weight sensor may be positioned on the base, and the weight sensor may be configured to sense the weight of the object placed on the base. The weight sensor may emit a weight measurement data signal relating to weight measurement data. The dimension sensors may be configured to sense the dimensions of the object placed on the base, and the dimension sensors may emit dimensional measurement data signals relating to dimensional measurement data.

The host computer may be in communication with the weight sensor and the dimensions sensors. The host computer may also be configured to receive the weight measurement data emitted by the weight sensor, and the host computer may be configured to receive the dimensional measurement data emitted by the dimension sensors. The dimension sensors may be remotely connectable to the host computer.

The host computer may be configured to control the weight sensor and the dimension sensors. The host computer may also be configured to output the weight measurement data and the dimensional measurement data to a computer network resource. The computer network resource may include a Uniform Resource Locator (URL). The URL may be configured to publish the weight measurement data and the dimensional measurement data to be accessible to computer-implemented package management processes.

The device may also include a pair of sidewalls. The sidewalls may be connected to the base and may be extending upwardly from the base. The pair of sidewalls may be positioned adjacent to the vertical support member. Ends of the pair of sidewalls may be positioned normal to each other.

The device may also include a communication unit. The communication unit may be coupled in communication with the weight sensor, the plurality of dimension sensors, and the host computer. The communication unit may comprise a wireless communication device. The communication unit may be configured to communicate the weight measurement data and/or the dimensional measurement data, which may be communicated via a network.

The communication unit may be carried by the base and/or the vertical support member, or the communication unit may be spaced apart from the base and/or the vertical support member. The dimension sensors may include a top dimension sensor and at least two side dimension sensors. The top dimension sensor may be positioned on the vertical support member. The side dimension sensors may be positioned adjacent the base.

The dimension sensors may be optical sensors, light sensors, ultrasound sensors and/or laser sensors. The weight measurement data may be related to the weight of the object, and the dimension measurement data may be related to the length, width, and height of the object.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

Figure 1:
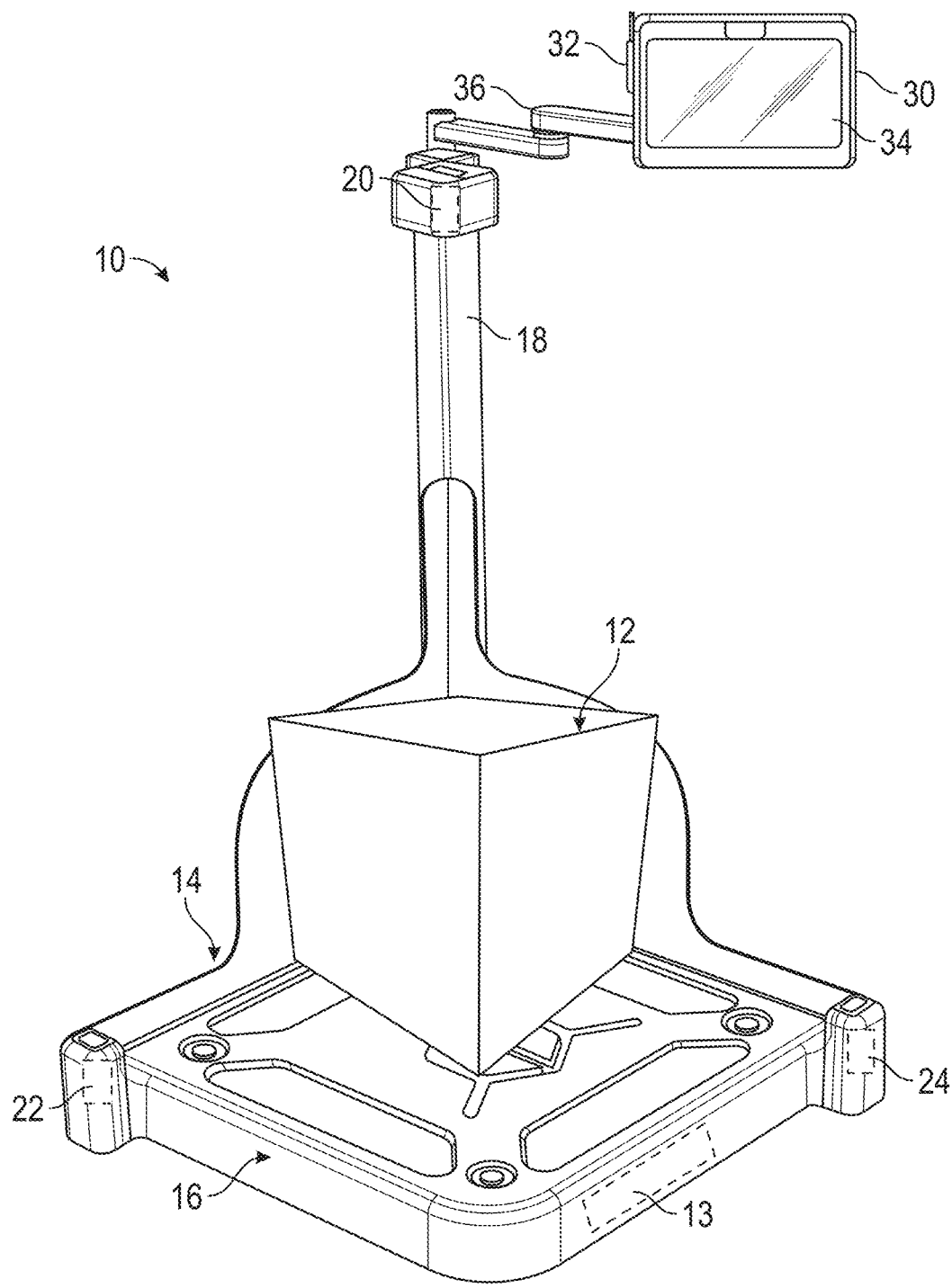
FIG. 1 is a front perspective view of an embodiment of a dimensioning device in accordance with features of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

The present system and method may use wireless communications. Generally, depending on the type of wireless communication system, a wireless communication device or mobile device, such as a smartphone, cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel or channels. For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

Mobile devices can be portable handsets, smartphones, or personal digital assistants, although they may be implemented in other forms. For example, mobile devices can be tablet computers, such as iPads, or other computing devices configured for communication through a mobile wireless communication network and/or other types of wireless communication links. Program applications, including the present warehouse management and shipping application, can be configured to execute on many different types of mobile devices. For example, a mobile device application can be written to execute on a Windows Mobile based mobile device, Android, iPhone, Java Mobile, or Blackberry based mobile device, for example.

An embodiment of the invention, as shown and described by the various figures and accompanying text, provides a dimensioning device for use with computer-implemented package and shipping management processes or warehouse management capabilities. The device and method are for ascertaining four-dimensional measurements of cuboidal and boxed items to provide data to computerized package management processes.

This approach addresses a key problem of how to get dimensions for a shipping order loaded into the system without requiring a user to input the data manually. As discussed above, typically a package is measured in three dimensions, width, length, and height and may also be measured by the weight. With a command (e.g. activation from an application running on a handheld or mounted device) these four values may be measured and read into the system (and web application) for use in preparing a package to be shipped.

Similar to how network printers may be configured for use in an application, there is an option to configure this network dimensioning device to read these dimension values. The dimensioning device may have a wired or wireless communication connection with the computer and/or network running the package and shipping management software, e.g. the device may be Wi-Fi enabled.

Figure 2:
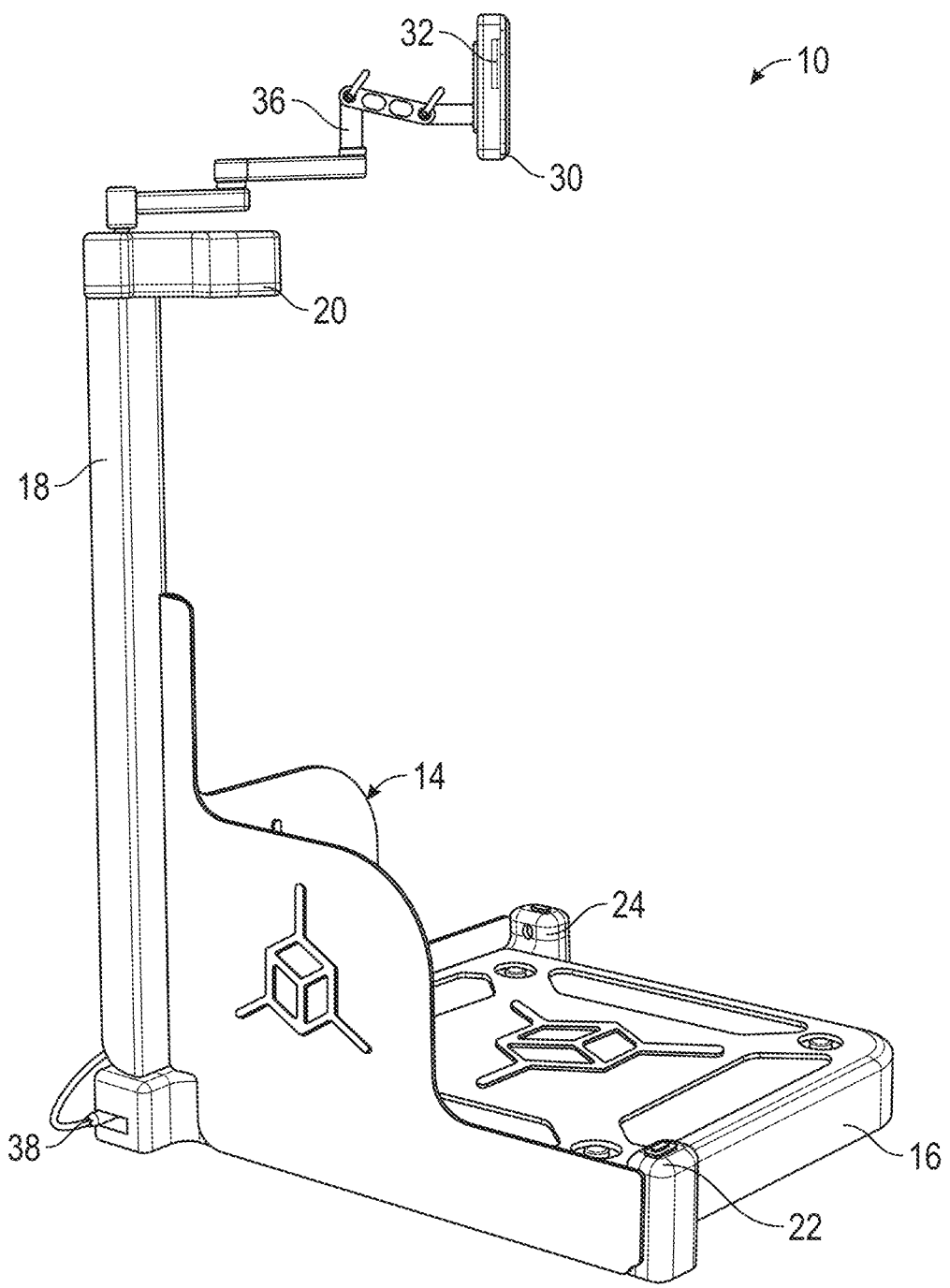
FIG. 2 is a side perspective view of the dimensioning device of FIG. 1.

Referring to FIGS. 1 and 2, an example embodiment of the present invention will be described. A package dimensioning device 10 is configured for ascertaining measurements of cuboidal and boxed items (e.g., package 12) to provide data to computer-implemented package management processes, e.g., order processing, marketplace listings, shipping processing and/or Warehouse Management Systems. While the description herein discusses the use of the device 10 in the context of shipping, it can also be used to gather information about a package for the purpose of listing it for sale on marketplaces, e.g., Amazon. This information would be collected at the time it is first received into a warehouse.

Order processing is the process or workflow associated with the picking, packing and delivery of packaged items to a shipping carrier and is a key element of order fulfillment. Order processing operations or facilities are commonly called "distribution centers" or "DC's". There are wide variances in the level of automation associating to the "pick-pack-and-ship" process, ranging from completely manual and paper-driven to highly automated and completely mechanized. A computer system overseeing these processes is generally referred to as a Warehouse Management System or "WMS".

WMS is a software application designed to support and optimize warehouse functionality and distribution center management. These systems facilitate management in using simplified automatic technologies useful in daily activities like planning, organizing, staffing, directing, warehouse keeping and controlling the utilization of available resources, to move and store materials inside, around and outside of a warehouse, while supporting staff in the performance of material movement and storage in and around a warehouse, without causing any large scale disruption to business resources.

The package dimensioning device 10 has a frame 14 including a base 16 and a vertical support member 18 extending vertically from the base. The base 16 is configured to receive the package 12 thereon. The base 16 includes a weight sensor 13 configured to output a weight data signal related to a weight of the package. The base 16 and weight sensor 13 of the package dimensioning device 10 act as a scale, weighing the package (e.g. up to 100 lbs.).

There are multiple space-apart contactless sensors including a top sensor 20 carried by the vertical support member 18, and side sensors 22, 24 positioned adjacent sides of the base 16. The top sensor 20 and the side sensors 22, 24 are configured to output dimensional data signals related to a height, length and width of the package 12. The sensors 20, 22, 24 may be mounted to the base 16 or carried by arms associated with the base to measure the dimensions of the box.

A control unit 30 is communicatively coupled to the weight sensor 13 and multiple spaced apart sensors 20, 22, 24 and configured to calculate weight, height, length and width measurements of the package 12 based upon the weight data signal and dimensional data signals. The control unit 30 may be implemented by hardware, software and/or firmware to provide the functionality described herein.

A communication unit 32 is coupled to the control unit 30 and configured to output the weight, height, length and width measurements to a computer network resource for access and use by the computer-implemented package management processes. In various embodiments, the communication unit may be a wireless communication interface, e.g., WiFi, Bluetooth, or any other compatible wireless communication protocol.

In various embodiments, the computer network resource may be a Uniform Resource Locator (URL) configured to publish the weight, height, length and width measurements so that the computer-implemented package management processes can access and use the weight, height, length and width measurements. The computer network resource may also be referred to as a shared resource, or network share, and is a computer resource made available from one host to other hosts on a computer network. It is a device or piece of information on a computer that can be remotely accessed from another computer transparently as if it were a resource in the local machine.

A display 34 may be carried by a display mount 36 and is configured to display the weight, height, length and width measurements to an operator. The display may be a touch-screen display and may operate as a user interface for the package dimensioning device 10. The display mount 36 may be an articulated arm, as illustrated, or other type of display holder. The display 34, control unit 30 and communication unit 32 may be integrated as a single component (as illustrated) or be separately located within the package dimensioning device 10 while being communicatively coupled together via wired or wireless channels. A power supply 38 may be carried by the frame 14 and may provide for plug-in outlet power or battery power as would be appreciated by those skilled in the art.

The power supply 38 may comprise of one or more batteries that may be removable, exchangeable and/or rechargeable. Alternatively, the measurement relay 200 may be configured to be powered by a measurement device 200 that the measurement relay 100 is in communication with. Alternatively, the power supply 38 of the measurement relay 100 may be configured to be supplied power from a measurement device 200 that the power supply 38 is in communication with. The power supply 38 may also be configured to regulate the power received from the measurement device 200.

Packages are handled and shipped by various shippers including United Parcel Service, Federal Express, USPS, DHL and many other smaller courier and delivery services. Typically, the charges by the carriers to their customers are based on the so-called "dim-weight factor" or "dimensional weight factor" (DWF) of the article being shipped. The DWF is an industry dimension calculated as the length times width times height in inches divided by a standard agency or association-recognized divisor or conversion factor, commonly 166 (L×W×H÷166). The "166" divisor or conversion factor has been recognized and adopted by the International Air Transport Association (I.A.T.A). Even if an object or package is of irregular configuration, the dim weight, using the longest measurement each of length, width, and height, may still be utilized for billing purposes. The volume computed by multiplication of object length times width times height may hereinafter be termed the "cubic volume," "spatial volume," or simply the "cube" of the object.

Accordingly, the scale defined at the base 12 of the device 10 measures the weight while the multiple sensors 20, 22, 24 provide data signals that are used in geometrical calculations internally by the dimensioning device or by the system to provide the length, width and height measurements of the package or box. The four measurements may be transmitted simultaneously to the system or to a handheld device. Also included is the functionality on the scale for tare weight, to basically rest the scale to zero.

The outputs from the device 10 are combined and may be displayed on a monitor, i.e., so they are visible to an operator on the display 34 (e.g. an LCD display of the control unit 30) using a user interface (e.g. XAML UI). Other devices, such as a handheld or mobile device, can also connect to the dimensioning device 10 via wireless or wired connections (e.g. via WiFi) and there may also be a wired or wireless connection (e.g. a USB cable connection) to transmit the dimensions to the host computer or network.

Figure 3:
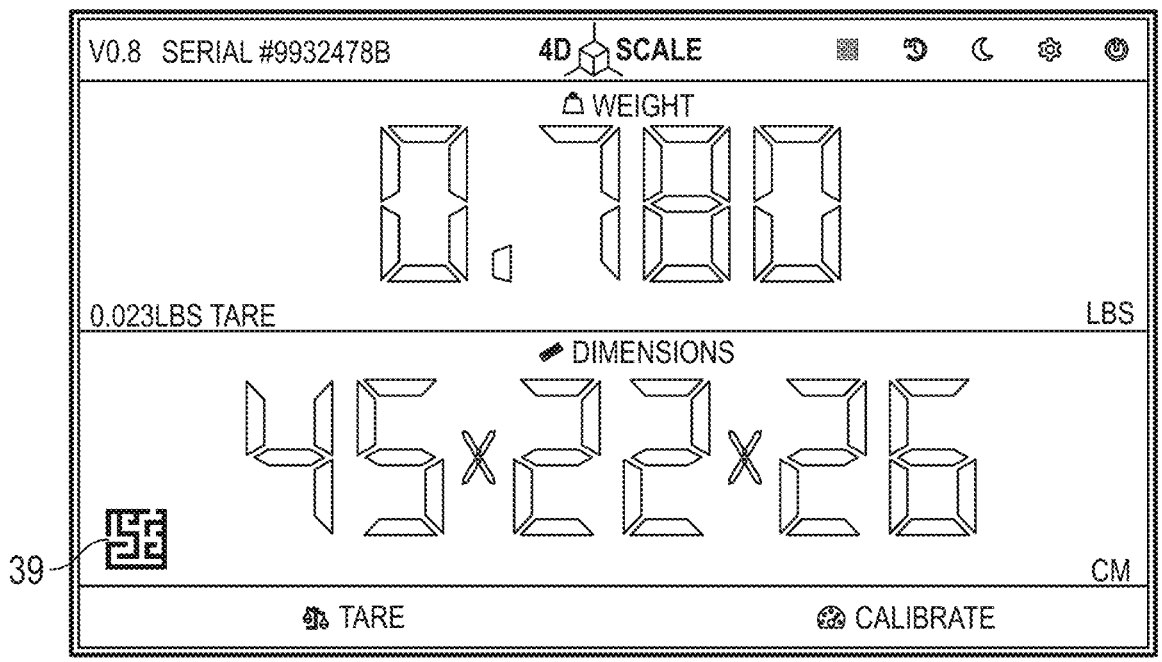
FIG. 3 is an illustration of an example of the display, of the dimensioning device of FIG. 1, showing the weight, height, length, and width measurements of a package.
Figure 4A:
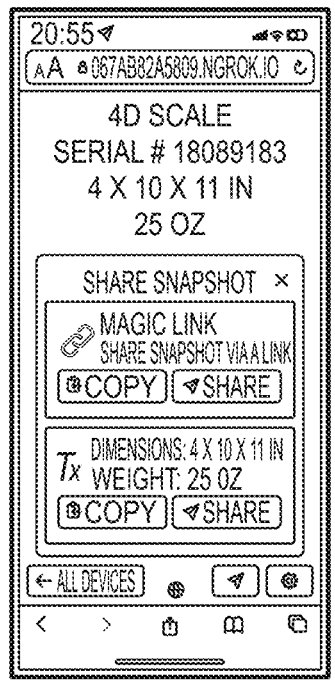
FIGS. 4A-4C are illustrations of examples of a mobile interface when a user views the weight, height, length and width measurements from the dimensioning device of FIG. 1 on their mobile device.
Figure 4B:
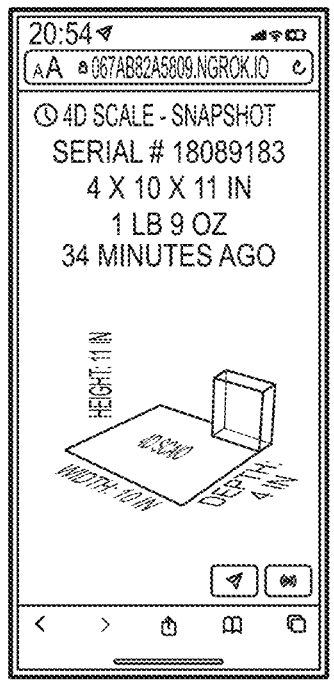
Figure 4C:
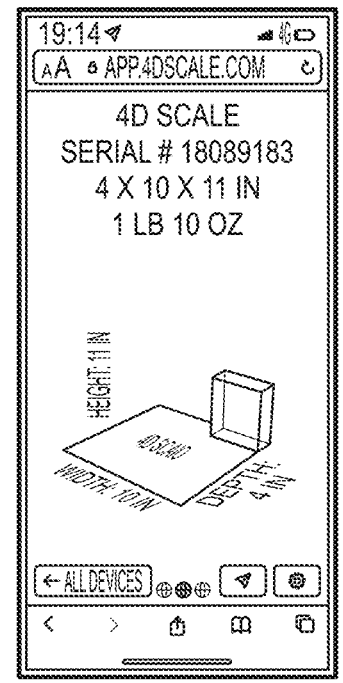
Figure 5:
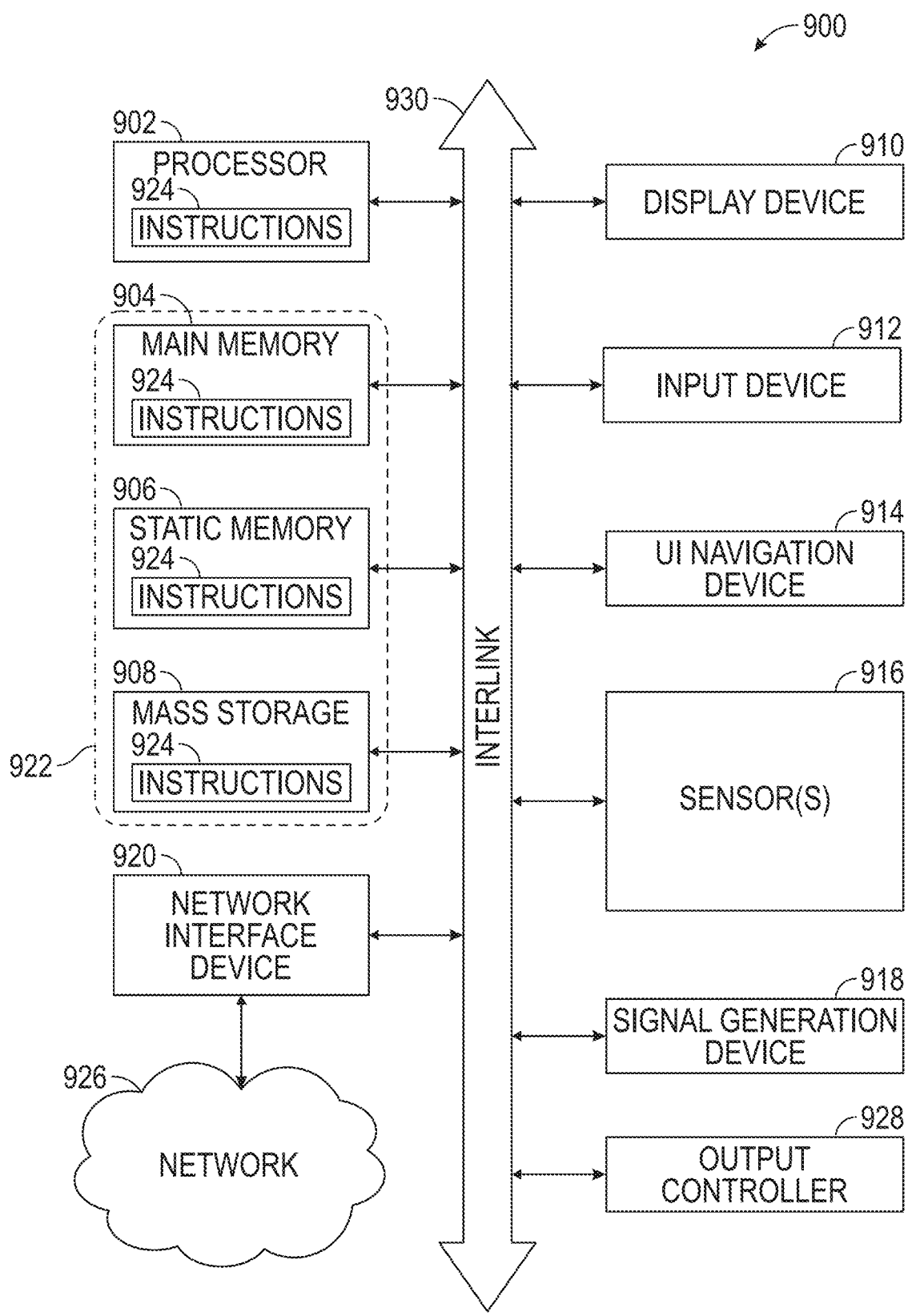
FIG. 5 illustrates a block diagram of an exemplary computer device that may control the warehouse/shipping capabilities and/or web application for use in connection with the dimensioning device of FIG. 1.
Figure 6:
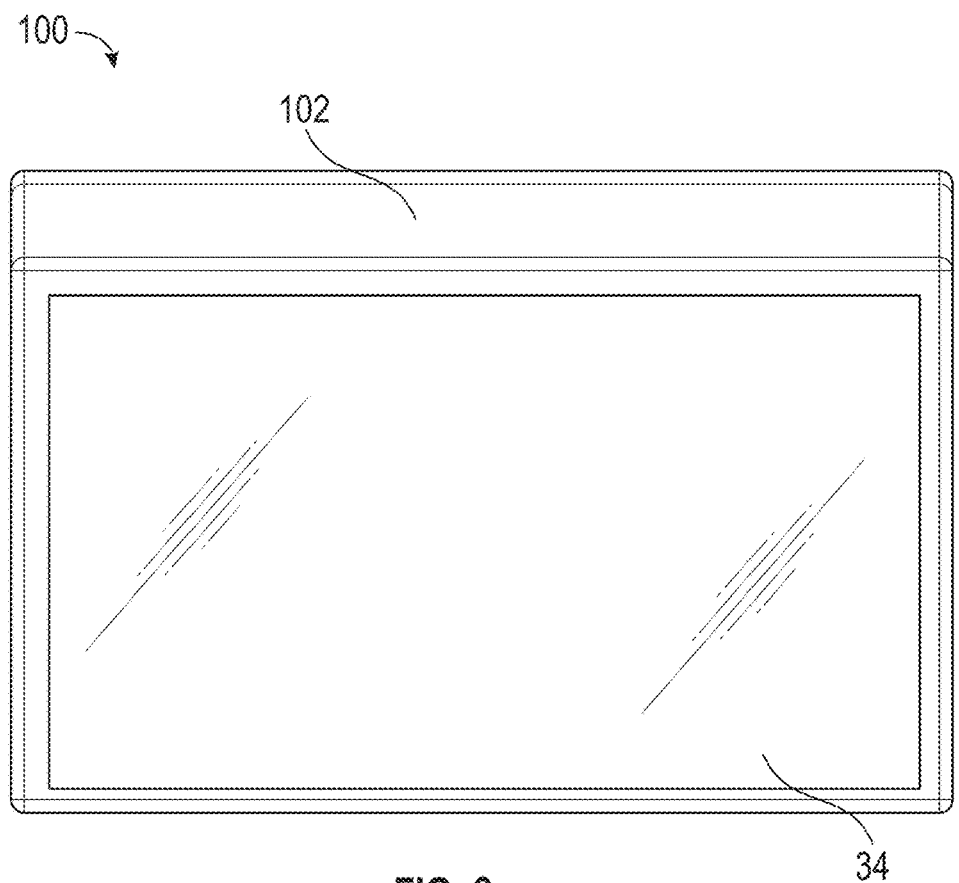
FIG. 6 is a perspective view of a measurement relay device according to an embodiment of the present invention.
Figure 7:
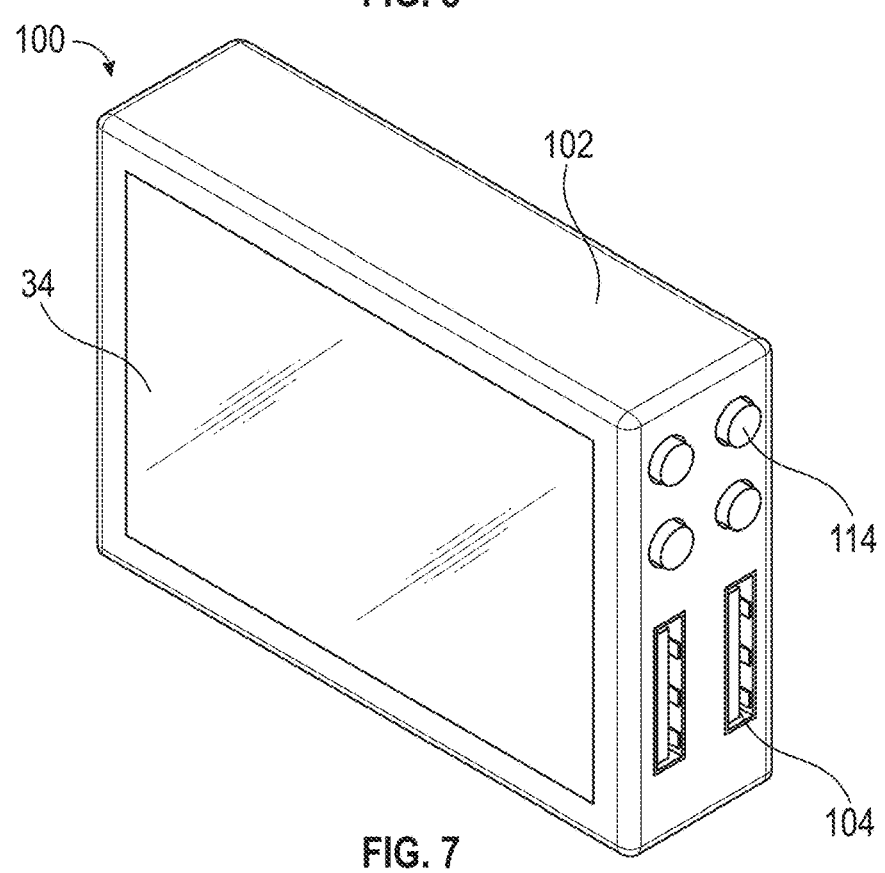
FIG. 7 is another perspective view of the measurement relay device of FIG. 6, showing the input interface and communication ports.
Figure 8:
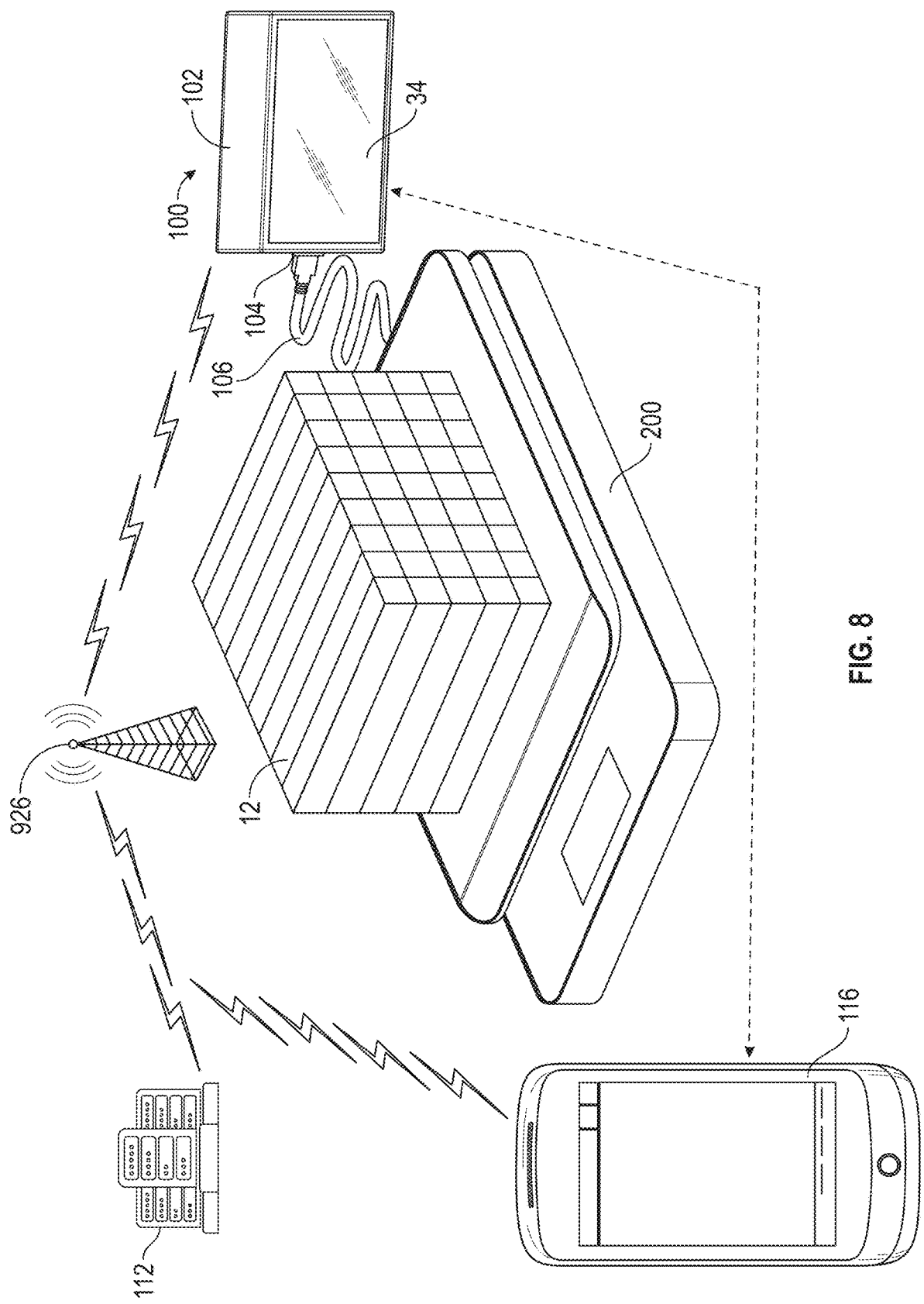
FIG. 8 is a perspective schematic view of the measurement relay device of FIG. 7 in communication with a measurement device, a server, and a mobile device.
Figure 9:
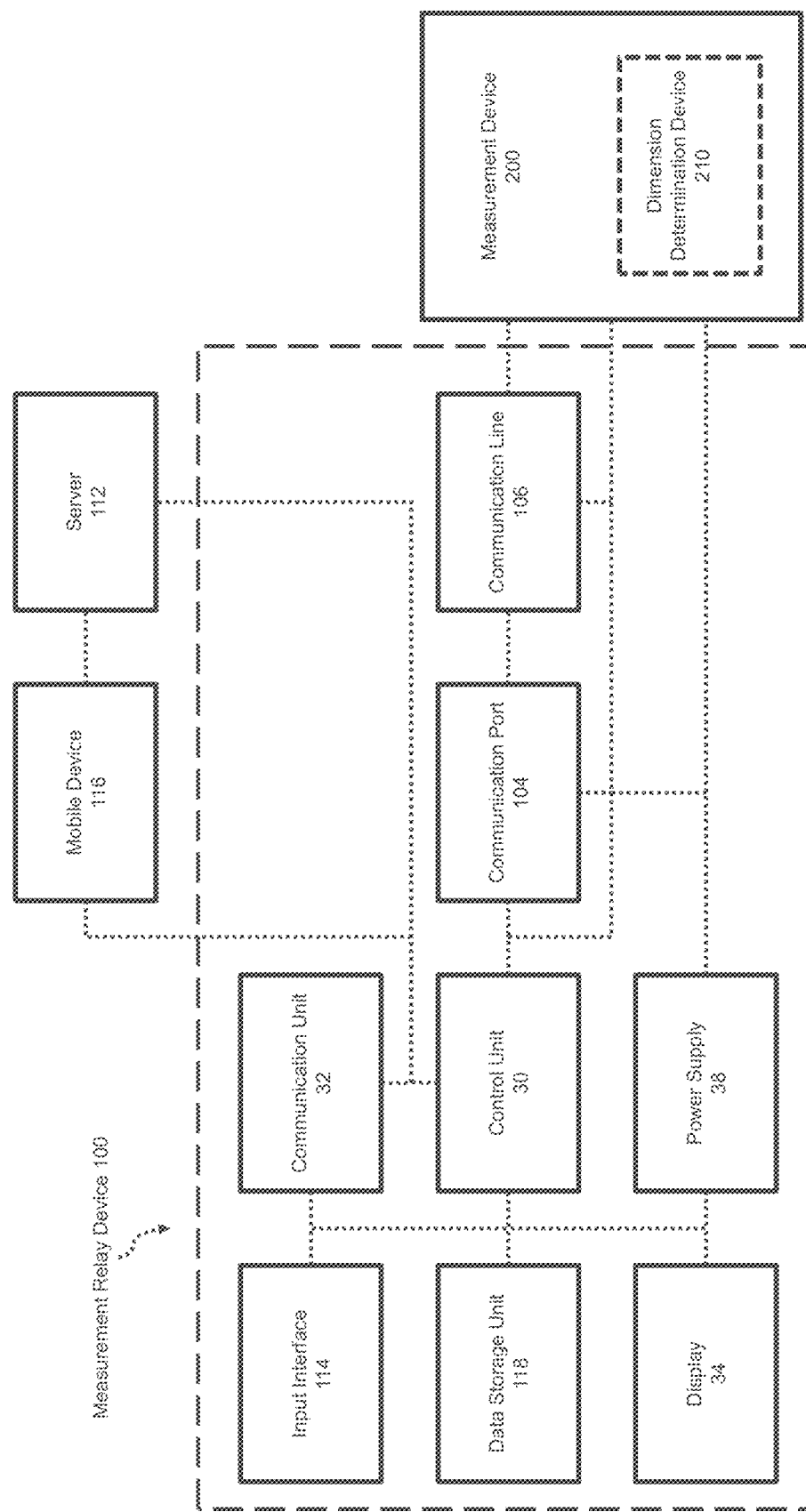
FIG. 9 is a schematic illustration of a measurement relay device according to an embodiment of the present invention.

FIG. 3 is an illustration of an example of the display 34 of the dimensioning device 10 and showing the weight, height, length and width measurements of a package. A scannable code may be included on this user interface. For example, a QR code 39 may be displayed on the display 34, and upon scanning with a mobile device, it opens a browser with the dimensions displayed and it can be shared with other apps on the mobile device, e.g., emailing a link etc. From the browser, the user can see which mobile devices are connected to the dimensioning device 10 and may change settings such as whether it displays the weight in imperial or metric. FIGS. 4A-4C are illustrations of examples of a mobile interface when a user views the weight, height, length and width measurements from the dimensioning device 10 on their mobile device, e.g. after scanning the QR code 39. The measurements may also be accessed using an Application Programming Interface (API).

So, the dimensions for a shipping order are loaded into the system without requiring a user to input the data manually. With a command (e.g. activation from a web application running on a handheld or mounted device) these four values are measured by the package dimensioning device 10 and then output into the warehouse/shipping system (and web application) to prepare the package 12 to be shipped. Since the dimensions are published to a network resource or URL, it can be accessed from within any web browser, and web based application. So, the information can be accessed anywhere over a network or the internet.

The contactless sensors, e.g., the top sensor 20 and side sensors 22, 24, may be laser sensors, optical sensors, light sensors and/or ultrasound sensors.

The measurements may benefit from tight control of all three calibration parameters: precision, accuracy and repeatability to provide quality data. Optical and laser sensors may be used in the embodiments, e.g., Laser Displacement, Inductive Displacement and Collimated Beam Sensors that provide high-speed and accurate measurements. The measurements may be carried out by optical sensors, using different kinds of light and thus may be contactless and maintenance free. The measurement technology may be based on laser, LED or structured light technology e.g., based on camera vision sensors.

Ultrasound technology is extremely safe, emitting no radiation (such as visible, ultraviolet, or infrared light), no audible sound, no odor, and no heat. Further, ultrasound, as used in the present invention, will not damage a package or its contents during the measurement operation. Finally, the ultrasonic sensors utilized in the present invention have no moving parts and may also be maintenance free.

Ultrasonic transducers and ultrasonic sensors are devices that generate or sense ultrasound energy. They can be divided into three broad categories: transmitters, receivers and transceivers. Transmitters convert electrical signals into ultrasound, receivers convert ultrasound into electrical signals, and transceivers can both transmit and receive ultrasound.

In a similar way to radar and sonar, ultrasonic transducers are used in systems which evaluate targets by interpreting the reflected signals. For example, by measuring the time between sending a signal and receiving an echo the distance of an object can be calculated. Passive ultrasonic sensors may, for example, be provided by microphones that detect ultrasonic noise that is present under certain conditions. The design of transducer can vary greatly depending on its use.

Ultrasound can also be used to make point-to-point distance measurements by transmitting and receiving discrete bursts of ultrasound between transducers. This technique is known as Sonomicrometry where the transit-time of the ultrasound signal is measured electronically (i.e. digitally) and converted mathematically to the distance between transducers assuming the speed of sound of the medium between the transducers is known. This method can be very precise in terms of temporal and spatial resolution because the time-of-flight measurement can be derived from tracking the same incident (received) waveform either by reference level or zero crossing. This enables the measurement resolution to far exceed the wavelength of the sound frequency generated by the transducers.

The present invention contemplates that the dimensioning device can be selected to operate in both metric and imperial units of measure for use in the USA or any other country. As such, the dimensioning device 10 may include a selection to operate in either metric or imperial units. The selection feature may be implemented by a switch or a touch screen selection, for example. As such, the control unit 30 may be configured to be selected to operate in one of metric and imperial units of measure.

FIG. 3 illustrates a block diagram of an example computer machine 900 upon which any one or more of the techniques (e.g., methods) discussed herein may perform. Examples, as described herein, may include, or may operate by, logic or several components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., wired or wirelessly networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or another sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine-readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

All of the above and below embodiments of the present invention mentioned herein are not to be read as limiting on each other in any way or capacity. All of what is described for the above and below embodiments of the present invention mentioned herein may share one or more, or none, of what is described for each member, structure, function, feature, and advantage, in a similar or same manner.

Now referring to FIGS. 6-11, alternative embodiments of the present invention may be directed to a measurement relay device 100 for portably reading and communicating weight measurements via a network 926. The measurement relay device 100 may include a housing 102, a display 34, a control unit 30, a communication unit 32, a power supply 38, a data storage unit 118, an input interface 114, a communication port 104, and a connection line 106. The housing 102 may have a number of outward facing surfaces. The display 34 may be positioned on one of the outward facing surfaces of the housing 102 and/or carried by the housing 102.

The control unit 30 may be carried by the housing 102, and the control unit 30 may be in communication with the display 34, the communication unit 32, the power supply 38, the data storage unit 118, the input interface 114, the communication port 104, the connection line 106, the network 926, the mobile device 116, the server 112, and a measurement device 200. The control unit 30 may be configured to control the members, devices, machines, components, and/or units that the control unit 30 is in communication with. The control unit 30 may comprise of any device that is capable of operating, reading, commanding, receiving, sending, and/or computing computer readable instructions. For example, without limitation, a processor, microprocessor, and/or microcontroller.

The communication unit 32 may be carried by the housing 102 and the communication unit 32 may be in communication with one or more of the control unit 30, the network 926, the display 34, the power supply 38, the data storage unit 118, the input interface 114, the communication port 104, the connection line 106, the mobile device 116, the server 112, and a measurement device 200. The communication unit 32 may comprise of a wireless transceiver and may be configured to be able to facilitate wireless communication.

The control unit 30 may be in communication with a measurement device 200. The control unit 30 and/or communication unit 32 may be in communication with the measurement device 200 by a wired or wireless connection, such as, without limitation, USB, SATA, Bluetooth, WiFi, Ad Hoc WiFi, NFC, and/or any other wired or wireless connection for communication as understood by those skilled in the art. The measurement relay device 100 may be spaced apart from the measurement device 200, such that there may be a length of distance between them. The measurement device 200 may comprise of a scale, and the scale used may be configured to measure weight of objects including, without limitation, packages. Alternatively, the measurement device 200 may comprise of a dimensioning determination device that is capable of determining the dimensions of an object, such as a package, including the length, width, and height of the object/package. The measurement data that is collected by the measurement relay device may be one or more of dimensions and weight of the package 12 and/or object.

The control unit 30 may be configured to receive a data relating to measurements, which may be measurements of a package 12 or an object, from the measurement device 108, which may be defined as measurement data. In embodiments of the present invention that include a dimension determination device, the measurement data may include both weight measurement data and dimension measurement data.

The control unit 30 may also be configured to be in communication with a mobile device 116 via the network 926. The communication between the control unit 30 and the mobile device 116 may be wireless communication. The wireless communication may be for example, without limitation, Bluetooth, Wi-Fi Ad-hoc, and/or Wi-Fi.

The display 34 may be configured to receive the data related to measurements and/or measurement data and display the data on the display 34. The display 34 may receive the data from one or more of the control unit 30, the communication unit 32, the network 926, the measurement device 200, and/or a server 112 that may be in communication with one or more of the control unit 30, the communication unit 32, the display 34, and/or the network 926. The measurement data may be configured to be displayed on the display 34. The display 34 may include a touch screen display, and the display 34 may be configured to emit an input signal upon user input of the display.

The measurement relay device 100 may also include an input interface 114 that may be positioned on one of the outward facing surfaces of the housing 102. The input interface 114 may also be carried by the housing 102. The input interface 114 may comprise of a button, switch, and/or knob. The input interface 114 may be in communication with the control unit 30, the communication unit 32, the display 34, and/or the network 926. The input interface 114 may be configured to emit an input signal upon an input made by a user. The control unit 30 may be configured to take a predetermined action based on the input signal emitted by the input interface 114 and received by the control unit 30. For example, without limitation, the predetermined action based on the input signal emitted by the input interface 114 may include power on/off, change modes of operation, and/or connect/disconnect to the network 926 or mobile device.

The control unit 30 may be configured to send and/or receive weight measurement data to and/or from the server 112 via the network 926. The mobile device 116 may be configured to operate the control unit 30 by emitting a command. The mobile device 116 may also be configured to display the measurement data received from the measurement relay device 100 or the servers 112 thereon the mobile device 116. The measurement data may be configured to be display on the mobile device 116. The network 926 may be a wireless communication network.

The measurement relay device 100 may include a power supply 38 that may be carried by the housing 102. The power supply 38 may also be a stand-alone power supply that is not attached to the housing 102. The power supply 38 may be in communication with a measurement device 108, and the power supply 38 may be configured to supply power to the measurement device 108. The power supply 38 may be in communication with, and may be configured to supply electrical power to, the communication unit 32, the control unit 30, the display 34, the input interface 114, the communication port 104, the connection line 106, and the measurement device 200.

The power supply 38 may comprise one or more of a power bank, power storage, and a power link. The power supply 38 may also comprise one or more batteries, a power outlet plug, and a power jack. Furthermore, the power supply 38 may comprise of one or more batteries that may be removable, exchangeable, and/or rechargeable. Alternatively, the measurement relay 200 may be configured to be powered by a measurement device 200 that the measurement relay 100 is in communication with. Alternatively, the power supply 38 of the measurement relay 100 may be configured to be supplied power from a measurement device 200 that the power supply 38 is in communication with. The power supply 38 may also be configured to regulate the power received from the measurement device 200.

Some embodiments of the present invention directed to a measurement relay device 100 may not include a display 34. The communication unit 32 may be configured to be in communication with a mobile device 116 by a wired or wireless connection. The mobile device 116 may be used to operate the measurement relay device 100, control unit 30, communication unit 32, and/or power supply 38. For example, the mobile device 116 may be used to enable the measurement relay device 100 to connect to a network 926, such as a wireless network and the internet.

The measurement relay device 100 may include a data storage unit 118. The data storage unit 118 may be carried by the housing 102 and may be in communication with the control unit 30, communication unit 32, input interface 114, the network 926, the measurement device 200, the communication port 104, the connection line 106, and/or a server 112. The data storage unit 118 may be configured to receive and send measurement data and store the received measurement data. The data storage unit 118 may be defined similarly or the same as described above for the main memory 904, static memory 906, and mass storage 908.

Some embodiments of the present invention directed to a measurement relay device 100 may include one or more communication ports 104 and one or more connection lines 106. The communication port 104 may be positioned on one of the outward facing surfaces of the housing 102. The communication port 104 may also be carried by the housing 102. The communication port 104 and the connection line 106 may be in communication with each other and may be configured to matingly engaged one another. The communication port 104 may be in communication with the measurement device 108, which may be via the connection line 106. The connection line 106 may be configured to be removably connectable to the measurement device 108 and the communication port 104.

The communication port(s) 104 be may be one or more of universal serial bus (USB) ports, including any version or type of USB port, such as, without limitation, USB type A, B, C, mini-A, mini-B, micro-A, micro-B USB, serial advance technology attachment (SATA), peripheral component interconnect (PCI), peripheral component interconnect express (PICe), ethernet, personal system/2 (PS/2), firewire IEEE 1394, thunderbolt, and lightning ports. The communication port(s) 104 may also be any type of ethernet port, cable port, fiber-optic port, coaxial port, and any other port for data communication to be used as a communication port 104 as understood by those skilled in the art. The connection line 106 may be one or more of any line for data communication as respectively mentioned above for the types of ports that the communication port 104.

A mobile device 116 may contain a measurement application. The measurement application may be operated on the mobile device 116 to send commands via the network 926 to operate and/or control the measurement relay device 100 and/or the control unit 30. The control unit 30 and/or communication unit 32 may be configured to emit and/or send the measurement data to one or more servers 112 that are in communication with the network 926. The servers 112 may be configured to receive, store, and send the measurement data. The servers 112 may be configured to send the measurement data to the mobile device 116 upon a command sent by the mobile device 116 that requests to receive the measurement data.

The measurement data may be indexed and/or filtered in the servers 112 based on a number of predetermined parameters including, without limitation, weight, height, width, length, dimensions, parameters, package type, package contents, package location, date, name, title, label, sender, recipient, and any other parameter for indexing packages as understood by those skilled in the art.

Embodiments of the present invention that are directed to a measurement relay device 100 are advantageous for the warehouse and shipping environment due to its portability. For example, without limitation, the measurement relay device 100 may be removably connected to measurement devices 108 that may be located throughout a warehouse or in vehicles or automobiles. Those skilled in the art will notice and appreciate that packages maybe be weighed by a measurement device 108 connected to a measurement relay device 100 located on or near a vehicle or automobile, with the measurement relay device 100 sending the measurement data to a server 112 or mobile device 116, making it unnecessary to weigh the packages at another location, such as at a warehouse. The measurement relay device 100 also advantageously removes the step of having individuals manually take note of the weight of the packages or input the weight of the packages into a database via a computer or input device.

A method embodiment of the present invention is for remotely capturing measurement data relating to a package 12. The method may include a step of receiving data relating to measurements of an object or a package 12 from a measurement device 200 with a control unit 30 that is carried by a housing 102. The data relating to measurements of the package 12 may be defined as measurement data. The method may also include the step of transmitting the measurement data via a network 926 with a communication unit 32. The communication unit 32 may be carried by the housing 102, and the communication unit 32 may be in communication with the control unit 30. The transmitted measurement data may be used to be incorporated into a computer implemented system that requires measurement data. The computer implemented system may be a shipping system that uses the measurement data of the package.

The method may also include the step of displaying the measurement data on a display 34 that may be in communication with the control unit 30. The display 34 may be carried by the housing 102. The control unit 30 may be removably connectable to the measurement device 200 via a connection line 106. The connection line 106 may comprise one or more of a universal serial bus (USB), serial advance technology attachment (SATA), peripheral component interconnect (PCI), peripheral component interconnect express (PICe), ethernet, personal system/2 (PS/2), firewire IEEE 1394, thunderbolt, lightning, and any other data connection line as understood by those skilled in the art.

The method may also include the step of supplying power to the measurement device 200 with a power supply 38. The method may further include the step of controlling the control unit 30 with an input interface 114. The input interface 114 may be carried by the housing 102 and the input interface 114 may be in communication with the control unit 30. The input interface 114 may comprise one or more of a button, switch, and a knob.

Another embodiment of the present invention may be directed to a method of remotely collecting and relaying measurement data using a measurement relay device 100 that comprises a housing 102, a control unit 30 that may be carried by the housing 102, and a communication unit 32 that may be carried by the housing 102. The communication unit 32 may be in communication with the control unit 30.

The method may comprise: connecting the measurement relay device 100 to a measurement device 200 and to a network 926; receiving the measurement data by the measurement relay device 100 from the measurement device 200, the data relating to measurements associated with an object; and transmitting the measurement data via the network 926 to be incorporated into a computer implemented system that requires the measurement data. The method may further comprise displaying the measurement data on a display 34 that is carried by the housing 102 and in communication with the control unit 30.

The measurement relay device 100 may be connected to the measurement device 200 via a connection line 106. The connection line 106 may comprise a universal serial bus (USB), serial advance technology attachment (SATA), peripheral component interconnect (PCI), peripheral component interconnect express (PICe), ethernet, personal system/2 (PS/2), firewire IEEE 1394, thunderbolt, and/or lightning. The communication unit 32 may comprise a wireless transceiver that may be configured to wirelessly connect to a server 112 on the network 926. The connection between the measurement relay device 100 and the measurement device 200 may be a wireless connection.

The measurement device 200 may comprise a scale. The measurement relay device 100 may further comprise a power supply 38. The power supply 38 may be used to provide power to the control unit 30, the display 34 and/or the communication unit 32. The power supply 38 may be further configured to provide power to the measurement device 200. The measurement device 200 may comprise a object measurement device 210. In embodiment of the present invention that include a object measurement device 210, the measurement data may include weight measurement data and dimension measurement data of an object and/or a package 12. The measurement data that is collected by the measurement relay device 100 and/or the measurement device 200 may include dimensions and/or weight of a package and/or object. The computer implemented system may be a shipping system that uses the measurement data of the package 12 and/or object. The method may further comprise controlling the control unit 30 with an input interface 114 that may be carried by the housing 102. The input interface 114 may be in communication with the control unit 30, the communication unit 32, the communication port 104, the connection line 106, the network 926, the server 112, the display 34, the power supply 38, and/or the mobile device 116. The input interface 114 may comprise a button, switch, and/or a knob.

Now additionally referring to FIGS. 12A-12D, the display 34 may be configured to display an interface. The interface may contain information and data that may include the weight of an object/package, and the dimensions of an object/package. The dimensions may include the length, width, and height of the object/package. The weight may be shown in various units of measurement including, without limitation, imperial units and metric units. The dimensions may also be shown in various units of measurement including, without limitation, imperial units and metric units. The interface may also contain information such as, without limitation, network 926 connection status, power status of the power supply 38, and account assignment for saving measurement data. As illustratively shown in FIG. 12C, the interface may contain a QR code 39 that may be scanned by a handheld device or mobile device 116 so that the mobile device 116 or handheld device may be directed to a computer network recourse or mobile application to view, manage, control, and/or operate an embodiment of the present invention, or to download the mobile application.

Figure 10:
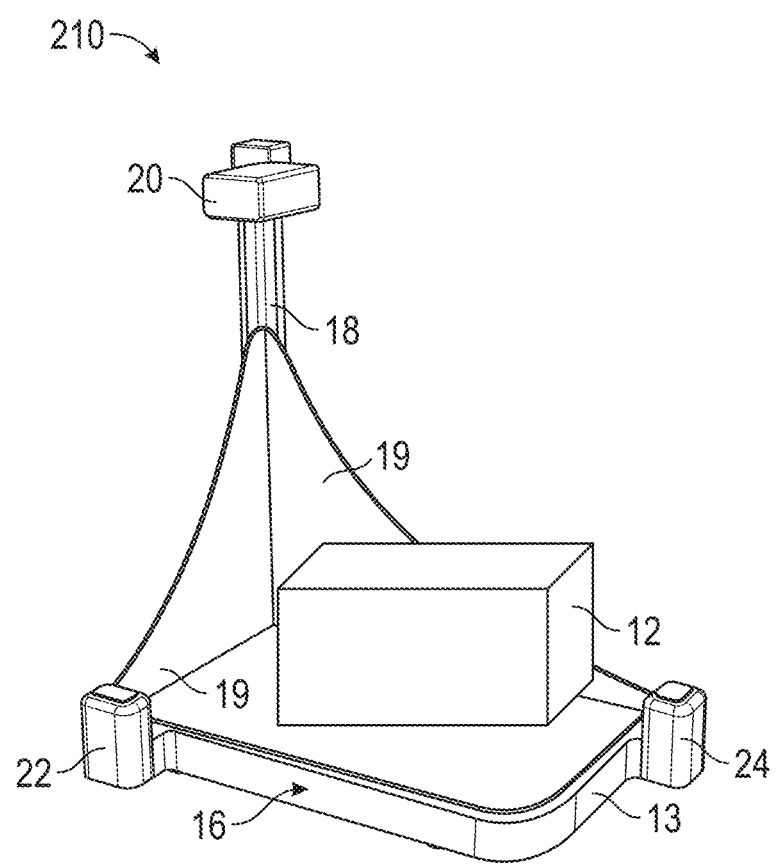
FIG. 10 is a perspective view of an object measurement device, showing a package thereon.
Figure 11:
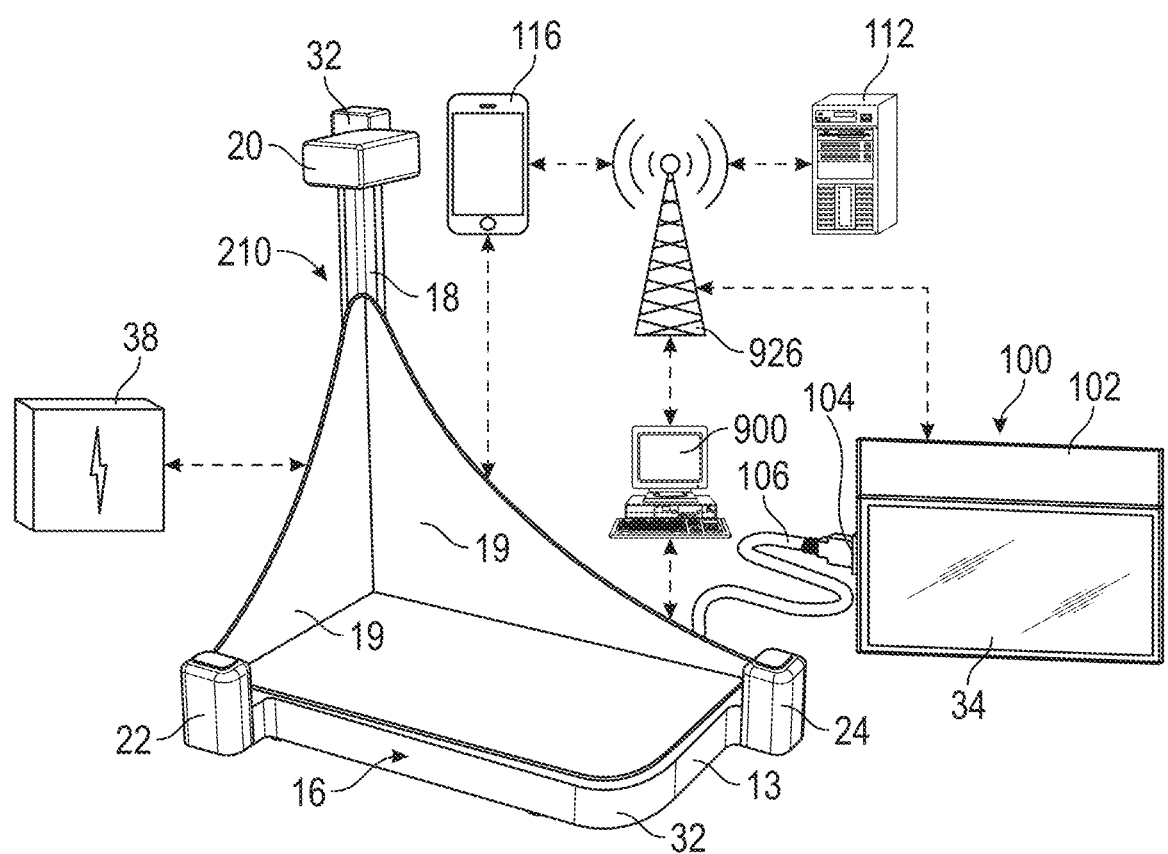
FIG. 11 is a perspective view of the object measurement device of FIG. 10, showing the object measurement device in communication with a measurement relay device and other components.
Figure 12A:
FIGS. 12A-D are illustrations of examples of an interface displayed on the display of the measurement relay device of FIG. 6.
Figure 12B:
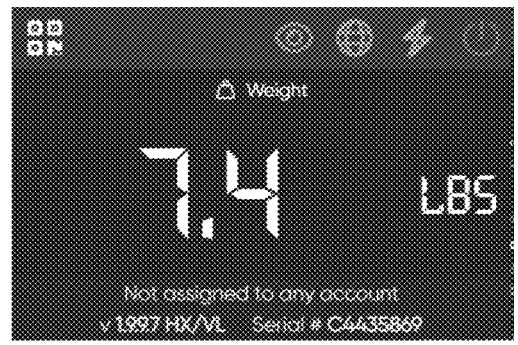
Figure 12C:
Figure 12D:
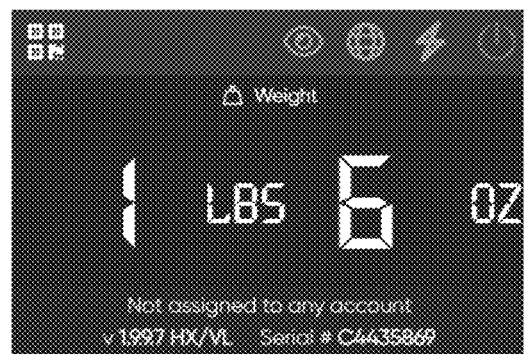
Figure 13:
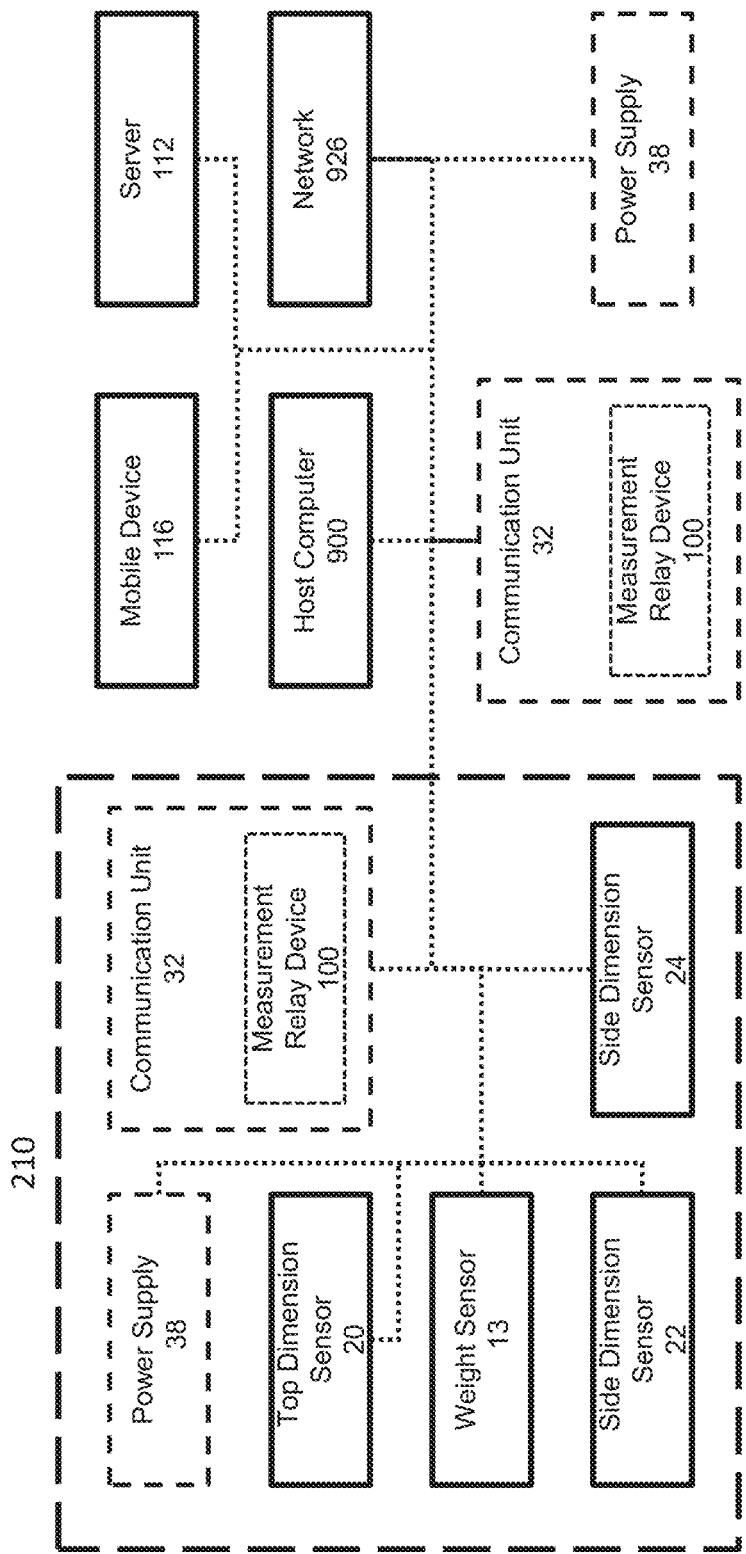
FIG. 13 is a schematic illustration of communication connections of the object measurement device of FIG. 11.

Now referring to FIGS. 10-11 and 13, some embodiments of the present invention may be for an object measurement device 210 for weighing and determining the dimensions of an object/package 12. The object measurement device 210 may include a base 16, a vertical support member 18, and at least a pair of sidewalls 19. The vertical support member 18 may be connected to a portion of the base 16. Specifically, the vertical support member 18 may be connected to a corner of the base 16, and the vertical support member 18 may be extending upwardly from the base 16 in an upwards direction.

The sidewalls 19 may be attached to the base 16, which may be on portions of an outer perimeter of the base 16, and the sidewalls 19 may be attached the vertical support member 18, which may be near or adjacent to where the sidewalls meet one another. The sidewalls 19 may be extending upwardly from the base 16 in a upwards direction, and the sidewalls 19 may be positioned adjacent to the vertical support member 18. The sidewalls 19 may also be positioned at an angle relative to each other, such as, without limitation, an angle relative to each sidewall 19 such that the sidewalls 19, and/or ends of the sidewalls 19, are normal to one another. Specifically, the sidewalls 19 may be positioned to form a 90-degree angle relative to one another.

The sidewalls 19 may be configured to form a corner so that a user may push an object or package against the sidewalls 19, which may be done to ensure that the object or package 12 is in a position on the base 16 where more accurate readings of the weight and/or the dimensions of the object/package 12 may be taken by the weight sensor 13 and/or the dimension sensors 20, 22, 24. More detail on the weight sensor 13 and the dimension sensors 20, 22, 24 is included above, and follows further below.

The object measurement device 210 may include a weight sensor 13, and one or more dimension sensors 20, 22, 24. The weight sensor 13 may be positioned on the base 16, or the weight sensor 13 may be carried by the base 16. Alternatively, the base 16 may comprise of a weight sensor 13. The weight sensor 13 may be configured to sense the weight of objects and/or packages 12 placed upon the base 16 and/or the weight sensor 13. The weight sensor 13 may be configured to emit a weight measurement data signal that may related to weight measurement data.

The one or more dimension sensors 20, 22, 24, may include a top sensor 20, a first side sensor 22, and a second side sensor 24. The dimension sensors 20, 22, 24, may be in communication with one another. The dimension sensors 20, 22, 24 may be configured to sense dimensions of an object and/or package 12. The dimensions of the object/package 12 sensed by the dimension sensors 20, 22, 24 may include a height, width, and length of the object/package 12. The dimension sensors 20, 22, 24 may comprise of optical sensors, light sensors, ultrasound sensors and laser sensors. The top sensor 20 may be positioned and/or attached to the vertical support member 18. The first side sensor 22 may be positioned and/or attached to a side of the base 16 and/or the weight sensor 13. The first side sensor 20 may be positioned and/or attached to an outer perimeter of the base 16. The second side sensor 24 may be positioned and/or attached to another side of the base 16 and/or the weight sensor 13. The second side sensor 24 may also be positioned and/or attached to an outer perimeter of the base 16.

The object measurement device 210 may include a communication unit 32. The communication unit 32 may be coupled with, in communication with, and/or configured to be remotely connected with, the base 16, the weight sensor 13, the dimension sensors 20, 22, 24, the network 926, the host computer 900, the mobile device 116, and the server 112. The communication unit 32 may be configured to receive weight measurement data and dimensional measurement data. The communication unit 32 may also be configured to communicate weight measurement data and dimensional measurement data via the network 926.

The communication unit 32 may be carried by the base 16 and/or the vertical support member 18. The communication unit 32 may also be spaced apart from the base 16 and/or the vertical support member 18. The communication unit 32 may comprise of a wireless communication device that may be configured to connect to and transceive data with a wireless form of communication and/or a wireless network 926. The communication unit 32 may be configured to send weight measurement data and/or dimensional measurement data to the host computer 900.

The communication unit 32 may comprise of a measurement relay device 100. The measurement relay device 100 may be defined the same or similarly as the measurement relay device 100 is defined further above and herein.

The object measurement device 210 may include a power supply 38. The power supply 38 may comprise of a rechargeable battery, a non-rechargeable battery, replaceable batteries, a wall outlet power source, a power regulator, and a power generator. The power supply 38 may be coupled with and configured to supply power to the base 16, the weight sensor 13, the dimension sensors 20, 22, 24, and/or the communication unit 32. The communication unit 32 may be configured to supply power to the object measurement device 210, specifically, the communication unit 32 may comprise of a measurement relay device 100 that is configured to supply power to the weight sensor 13, the dimension sensors 20, 22, 24, and/or the power supply 38 of the object measurement device 210.

The host computer 900 may be configured to receive weight measurement data from the weight sensor 13 and may be configured to receive dimensional measurement data from the dimension sensors 20, 22, 24, which may be received by the host computer 900 via the communication unit 32 and/or the network 926. The host computer 900 may be configured to supply power to the weight sensor 13 and/or the dimension sensors 20, 22, 24. The host computer 900 may also be configured to control the weight sensor 13 and/or the dimension sensors 20, 22, 24, which may be via the communication unit 32 and/or the network 926. The host computer 900 may be configured to output the weight measurement data and the dimensional measurement data to a computer network resource via the network 926. The computer network resource may be on the network 926 and may be located in a server 112 that is coupled in communication with the network 926. The computer network resource may include a Uniform Resource Locator (URL). The URL may be configured to publish the weight measurement data and the dimensional measurement data, which may be accessible to computer-implemented package management processes.

The host computer 900 may include a user interface configured to facilitate inputs made by a user of the host computer 900. The host computer 900 may emit sensor control signals to the weight sensor 13 and/or dimension sensors 20, 22, 24 based upon the inputs made by the user on the host computer 900 via the user interface of the host computer 900. The weight sensor 13 and the dimension sensors 20, 22, 24 may be configured to receive the sensor control signals and take a predetermined action thereafter.

The server 122 may be coupled in communication with the network 926. The server 122 may comprise of one or more servers that are in communication with one another and/or the network 926. The server 112 may be configured to receive, store, and send data including weight measurement data and dimension measurement data via the network 926. The server 122 may include various components and members as understood by those skilled in the art that may be used within and for a server 122. For example, without limitation, the server 122 may include one or more processors, hard drives, static memory, non-static memory, volatile memory, non-volatile memory, random access memory (RAM), network devices, power supplies, interconnection bridges such as motherboards, graphics processing units (GPUs), and computer readable information/code readers and writers.

The server 122 may be configured to send weight measurement data and/or dimension measurement data to a computer device in communication with the network 926 upon the server 122 receiving a data request signal from the computer device. The computer device may include, without limitation, of a laptop, mobile device 116, personal computer, tablet, computer terminal, handheld device, and/or a desktop computer.

Some of the illustrative aspects of the present invention may be advantageous in solving the problems herein described and other problems not discussed which are discoverable by a skilled artisan.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

Users may download an application on their mobile phones, tablets or any other mobile computing device, and even a vehicle.

The disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features may be recited in claims and/or disclosed in the specification, these combinations are not intended to limit the disclosure of possible implementations. In fact, many of these features may be combined in ways not specifically recited in the claims and/or disclosed in the specification. Although each dependent claim listed herein may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As may be used herein, the terms "substantially" and "approximately" provides an industry-accepted tolerance for its corresponding term and/or relativity between items. Such an industry-accepted tolerance ranges from less than one percent to fifty percent. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

As may also be used herein, the terms "processor", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

The embodiments of the invention described herein are exemplary and numerous modifications, variations and rearrangements can be readily envisioned to achieve substantially equivalent results, all of which are intended to be embraced within the spirit and scope of the invention. Further, the purpose of any included abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

What is claimed is:

1. An object measurement device configured to ascertain measurements of an object and to provide data to a host computer, the device comprising:
   a base configured to carry the object thereon;
   a vertical support member extending upwardly from the base;
   a weight sensor positioned on the base and configured to sense a weight of the object and emit a weight measurement data signal relating to weight measurement data; and
   a plurality of dimension sensors configured to sense dimensions of the object and to emit dimensional measurement data signals relating to dimensional measurement data;
   wherein the host computer is in communication with the weight sensor and with the plurality of dimension sensors; and
   wherein the host computer is configured to receive the weight measurement data and the dimensional measurement data.

2. The object measurement device of claim 1, wherein the weight sensor and the plurality of dimension sensors are remotely connectable to the host computer; and wherein the host computer is configured to control the weight sensor and the plurality of dimension sensors.

3. The object measurement device of claim 1, wherein the host computer is configured to output the weight measurement data and the dimensional measurement data to a computer network resource that comprises a Uniform Resource Locator (URL) that is configured to publish the weight measurement data and the dimensional measurement data to be accessible to computer-implemented package management processes.

4. The object measurement device of claim 1, further comprising a pair of sidewalls connected to the base and extending upwardly therefrom; wherein the pair of sidewalls are positioned adjacent to the vertical support member; and wherein ends of the pair of sidewalls are positioned normal to each other.

5. The object measurement device of claim 1, further comprising a communication unit coupled in communication with the weight sensor, the plurality of dimension sensors, and the host computer; wherein the communication unit comprises a wireless communication device; and wherein the communication unit is configured to communicate at least one of the weight measurement data and the dimensional measurement data via a network.

6. The object measurement device of claim 5, wherein the communication unit is configured to at least one of being carried by one of the base and the vertical support member, and spaced apart from the base and the vertical support member.

7. The object measurement device of claim 1, wherein the plurality of dimension sensors comprise a top dimension sensor and at least a pair of side dimension sensors; wherein the top dimension sensor is positioned on the vertical support member; and wherein the at least a pair of side dimension sensors are positioned adjacent the base.

8. The object measurement device of claim 1, wherein the plurality of dimension sensors comprise at least one of optical sensors, light sensors, ultrasound sensors and laser sensors.

9. The object measurement device of claim 1, wherein the weight measurement data is related to the weight of the object; and wherein the dimension measurement data is related to the length, width, and height of the object.

10. An object measurement device configured to ascertain measurements of a package and to provide data to a host computer, the device comprising:
    a base configured to carry the package thereon;
    a vertical support member extending upwardly from the base;
    a weight sensor positioned on the base and configured to sense a weight of the package and emit a weight measurement data signal relating to weight measurement data;
    a plurality of dimension sensors configured to sense height, length and width of the package and to emit dimensional measurement data signals relating to dimensional measurement data; and
    a pair of sidewalls connected to the base and extending upwardly therefrom configured to constrain and guide placement of the package on the base;
    wherein the pair of sidewalls are positioned adjacent to the vertical support member;
    wherein ends of the pair of sidewalls are positioned normal to each other;
    wherein the host computer is in communication with the weight sensor and with the plurality of dimension sensors;
    wherein the host computer is configured to receive the weight measurement data and the dimensional measurement data; and
    wherein the host computer is configured to use the weight measurement data and the dimensional measurement data in connection with a computer implemented shipping system.

11. The object measurement device of claim 10, wherein the weight sensor and the plurality of dimension sensors are remotely connectable to the host computer; and wherein the host computer is configured to control the weight sensor and the plurality of dimension sensors.

12. The object measurement device of claim 11, wherein the host computer is configured to output the weight measurement data and the dimensional measurement data to a computer network resource that comprises a Uniform Resource Locator (URL) that is configured to publish the weight measurement data and the dimensional measurement data to be accessible to computer-implemented package management processes.

13. The object measurement device of claim 10, further comprising a communication unit coupled in communication with the weight sensor, the plurality of dimension sensors, and the host computer; wherein the communication unit comprises a wireless communication device; and wherein the communication unit is configured to communicate at least one of the weight measurement data and the dimensional measurement data via a network.

14. The object measurement device of claim 13, wherein the communication unit is configured to at least one of being carried by one of the base and the vertical support member and spaced apart from the base and the vertical support member.

15. The object measurement device of claim 10, wherein the plurality of dimension sensors comprise a top dimension sensor and at least a pair of side dimension sensor; wherein the top dimension sensor is positioned on the vertical support member; and wherein the at least a pair of side dimension sensors are positioned adjacent the base.

16. The object measurement device of claim 10, wherein the plurality of dimension sensors comprise at least one of optical sensors, light sensors, ultrasound sensors and laser sensors.

17. An object measurement device configured to ascertain measurements of an object and to provide data to a host computer, the device comprising:
    a base configured to carry the object thereon;
    a vertical support member extending upwardly from the base;
    a weight sensor positioned on the base and configured to sense a weight of the object and emit a weight measurement data signal relating to weight measurement data;
    a plurality of dimension sensors comprising:
        a top dimension sensor positioned on the vertical support member;
        a first side dimension sensor positioned adjacent one side of the base; and
        a second side dimension sensor positioned adjacent another side of the base;
        wherein the upper dimension sensor, the first lower dimension sensor, and the second lower dimension sensor are in communication with one another and are configured to sense height, length and width of the object and to emit dimensional measurement data signals relating to dimensional measurement data;
    a communication unit comprising a measurement relay device in communication with the weight sensor and the plurality of dimension sensors, and configured to receive and emit the weight measurement data and the dimensional measurement data; and
    wherein the host computer is in communication with the communication unit to receive the weight measurement data and the dimensional measurement data.

18. The object measurement device of claim 17, wherein the communication unit is remotely connectable to the host computer; and wherein the host computer is configured to control the weight sensor and the plurality of dimension sensors via the communication unit.

19. The object measurement device of claim 17, wherein the host computer is configured to output the weight measurement data and the dimensional measurement data to a computer network resource that comprises a Uniform Resource Locator (URL) that is configured to publish the weight measurement data and the dimensional measurement data to be accessible to computer-implemented package management processes.

20. The object measurement device of claim 17, further comprising a pair of sidewalls connected to the base and extending upwardly therefrom; wherein the pair of sidewalls are positioned adjacent to the vertical support member; and wherein ends of the pair of sidewalls are positioned normal to each other.

21. The object measurement device of claim 17, wherein the communication unit is configured to communicate at least one of the weight measurement data and the dimensional measurement data via a network.

22. The object measurement device of claim 21, wherein the communication unit is configured to at least one of being carried by one of the base and the vertical support member and spaced apart from the base and the vertical support member.

23. The object measurement device of claim 17, wherein the plurality of dimension sensors comprise at least one of optical sensors, light sensors, ultrasound sensors and laser sensors.

24. The object measurement device of claim 17, wherein the weight measurement data is related to the weight of the object; and wherein the dimension measurement data is related to the length, width, and height of the object.

* * * * *